United States Patent Office

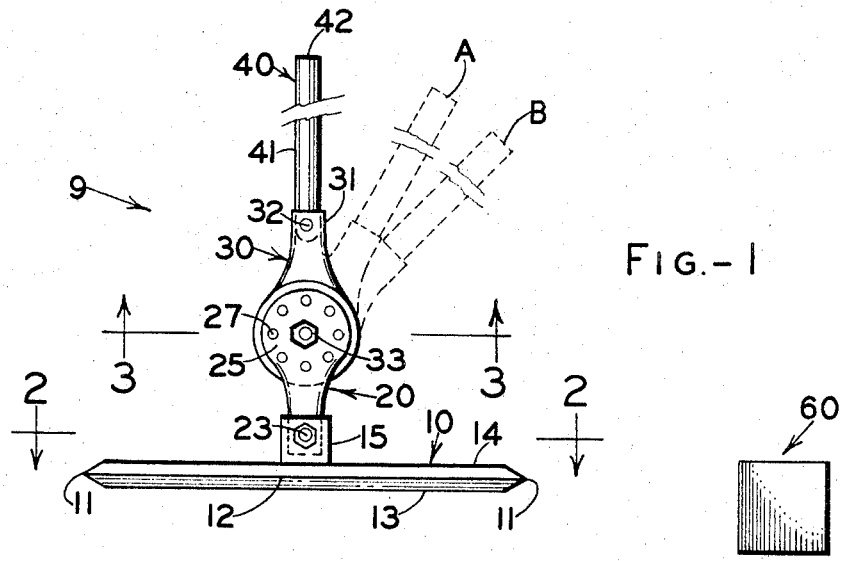
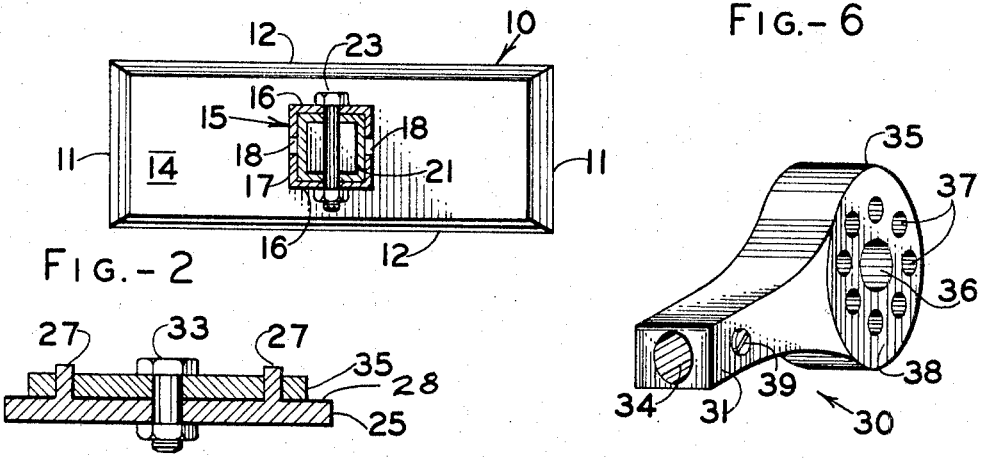
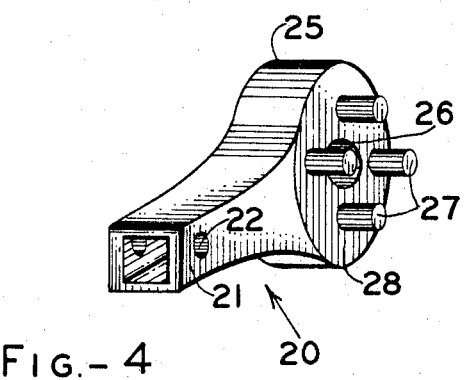

3,378,923
Patented Apr. 23, 1968

3,378,923
MULTIPURPOSE IMPLEMENT
Anthony Andrew Trush, 218 N. 19th St., Apt. 5,
Omaha, Nebr. 68102
Filed Jan. 16, 1967, Ser. No. 609,406
8 Claims. (Cl. 30—318)

ABSTRACT OF THE DISCLOSURE

This invention relates to a multipurpose hand tool or implement, and especially this invention relates to a multipurpose tool suitable for various tasks including cutting plant growth, hoeing the earth, and scraping off ice and similarly adherent topical layers.

Specification

There are in the prior art hand implements which are designed for various tasks, representative of the prior art being United States Patents 1,823,438 and 1,903,264. However, none of the prior art devices are sufficiently versatile to adequately accomplish those three tasks which the typical homeowner is likely to encouter, to wit: cutting weeds and other plant growth, cultivation of plants, and removing ice and similar topical adherent layers from concrete and other substrates. The difficulties in the prior art have resided in the provision of a blade component that is adaptable for a variety of tasks, and in the provision of a handle component that is adaptable for a variety of selectable positions in all three spacial dimensions with respect to the blade component without impairing the necessary rigidity of the implement during use thereof.

It is accordingly the general object of the present invention to overcome the several disadvantages of the prior art relating to multipurpose hand implements.

It is a specific object of the present invention to provide an exceedingly versatile blade component for multipurpose hand implements. It is an ancillary object to provide a blade component that may be readily replaced with another blade of better condition or of different shape.

It is another object of the present invention to provide a variety of selectable positions, in all three spacial dimensions, between the elongate handle component and the blade component so as to render the implement suitable for a wide variety of tasks. It is an ancillary object to provide rigid association between the elongate handle and the blade component irrespective of the selected relative position between them.

It is yet another object of the present invention to provide a multi-purpose implement device that is rugged and able to withstand strenuous tasks and abuse, and that is economical to manufacture and repair.

With the above and other objects and advantages in view, which will become more apparent as the description proceeds, the invention comprises the novel configuration, combination, and arrangement of parts, as hereinafter more fully described, reference being had to the accompanying drawing wherein like numbers refer to like parts in the several views, and in which:

FIGURE 1 is a plan view of the multi-purpose implement of the present invention.

FIGURE 2 is a sectional elevational view taken along line 2—2 of FIGURE 1.

FIGURE 3 is a sectional elevational view taken along line 3—3 of FIGURE 1.

FIGURE 4 is a perspective view of the preferred type coupling member component for the present invention.

FIGURE 5 is a perspective view of the preferred type adapter member component for the multi-purpose implement for the present invention.

FIGURE 6 is a forward elevational view of an alternate type tetragonal blade component, herein of a square shape.

The multipurpose implement 9 comprises a non-circular blade component 10 at the forward end thereof; a coupling member 20 positioned rearwardly of blade 10; an adapter member 30 positioned rearwardly of coupling 20 and adapter to be removably attached to said coupling at a plurality of rigid angular positions relative thereto; and an elongate handle 40 positioned rearwardly of adapter 30. There are means for removably attaching the forward portion of coupling member 20 to the blade 10 at any one of a plurality of selectable spaced positions about the coupling member axis and also at a fixed angular relationship between the coupling member axis and the blade 10; such means, together with the novel adapter-coupling combination, provides the preferred manner of associating handle 40 and blade 10 in a variety of three-dimensional relationships.

Blade 10 is generally tetragonal having a forward surface 13, that is preferably substantially planar, and a rearward surface 14. The tetragonal blade 10 has at least two opposed parallel sharp edges, e.g. 12, which are preferably of relatively greater length than the remaining two edges, e.g. 11, and said elongate parallel edges 12 are particularly desirable for cutting weeds and other plant growth. For reasons to be described later, the two shorter edges 12 are desirably parallel, and consequently, the preferred blade shape shown in FIGURE 2 is rectangular. The two elongate edges 12 are desirably of more gradual taper and hence sharper than shorter edges 12, and normally it is desirable to maintain the keenness of parallel edges 12 and to restrict hoeing and scraping operations, for which relatively dull edges are suitable, to the remaining two edges 11.

Attached to a central portion of blade 10 at a fixed angular relationship thereto, and preferably uprightly thereto, is a rearwardly extending rigid coupling member 20. Coupling 20 may be removably attached to blade 10 at a finite plurality of selectable spaced positions about the axis of coupling 20, and in such event, blade 10 includes at the rearward side 14 a rearwardly extending protrusion, herein as a rectangular socket 15. Socket 15 is preferably of square shape having four sidewalls including alternating opposed parallel sidewalls 16 that are also parallel to elongate keen edges 12 and including intervening opposed parallel sidewalls 17 that are also parallel to shorter blade edges 11. There is a pair of aligned transverse perforations 18 through the alternating sidewalls 16; additionally, intervening sidewalls 17 may also have a similar pair of aligned transverse perforations 18. As can best be seen in FIGURES 2 and 4, the forward portion of coupling 20, herein as a shank 21 of rectangular cross-sectional shape, mateably extends into the rectangular opening of socket 15 so as to fix the angular relationship between blade 10 and the axis of coupling 20. Coupling shank 21 includes a pair of aligned transverse perforations 22 therethrough, and coupling 20 is attached to blade 10 by means of a transverse rod 23, herein as a removably attached bolt, passing through perforations 22 of shank 21 and perforations 18 of alternating sidewalls 16.

Attached to a rearward portion, e.g. 25, of coupling 20 at a plurality of selectable angular positions relative thereto is the forward portion, e.g. 35, of rigid adapter member 30. While there are several means for attaching adapter 30 to coupling 20 at a plurality of selectable angular positions between the axes of members 20 and 30, the combined use of spindles, mating holes therefor, and a removable transverse pin, preferably a bolt 33, is a superior and preferred type means. The preferred type means may comprise a transverse central perforation 26 in the circular rearward plate-like portion 25 of coupling 20 and a mating transverse central perforation 36 in the circular forward plate-like portion 35 of adapter 30. The coupling 20 and adapter 30 are removably attached together in adjacent side-by-side and abutting relationship as by means of a removable pin member, herein as a nut and bolt combination 33, removably passing through aligned central holes 26 and 36. The adjacent abutting surfaces, surface 28 of coupling 20 and surface 38 of adapter 30, are preferably planar and are substantially normal to transverse rod 23 and to transverse bolt 33.

Spaced about the central hole 26 of coupling 20 and extending transversely and normally of surface 28 are a plurality of transverse integral spindles 27, herein four in number, spaced at regular angular intervals with respect to transverse perforation 26. Spaced about the central perforation 36 of adapter 30 and extending transversely therethrough are a plurality of transverse holes 37, herein eight in number, spaced at regular angular intervals with respect to perforation 36. Holes 37 are parallel with transverse perforation 36. Spindles 27 extend through holes 37 to temporarily fix the angular relationship between the axes of coupling 20 and adapter 30. It is essential that the angular relationship of spindles 27 and holes 37 be at an exact angular multiple and at the same radial distance from aligned perforations 26 and 36 so that the spindles 27 extend through the radially positioned holes 37. It is not essential that the number of spindles 27 and holes 37 be identical just so that there is at least one spindle. Preferably, a plurality of spindles is preferred in the event that one or more should fracture during repeated use of multipurpose implement 9. Of course, the spindle and mating holes positions could be reversed with the spindles being on adapter 30 and the registrable holes being in coupling 20.

The rearward portion 31 of adapter 30 has at the rearward end a forwardly extending bore 34 to accommodate the forward end 41 of handle 40. Handle 40 may be removably attached to adapter 30 as by means of a transverse set screw 39 passing through adapter rearward portion 31 and removably penetrating into handle 40 near forward end 41. However, it is preferable that the handle 40 be rigidly attached to adapter 30 with rivet 32 because of the stresses encountered with scraping and hoeing operations. Handle 40 and mating bore 34 are preferably of elliptical configuration with the major axis being substantially parallel to weed cutting edges 12. With such an elliptical cross-sectional contour on handle 40, the implement 9 is easier to use without undue operation fatigue and palm abrasion during weed cutting operations. Handle 40 is substantially normal to rod 23 and pin 33.

When it is desired to utilize implement 9 for cutting weeds, handle 40 is best employed in substantial perpendicular relationship with respect to the relatively thin blade 10, and the appropriate angular relationship between the axes of adapter 30 and coupling 20 is employed, as by the use of selectively engageable spindles 27 and radially positioned holes 37. When it is desired to scrape adherent topical layers, e.g. ice, handle 40 is employed at a low acute angle relationship with respect to blade 10, as shown in dotted line B in FIGURE 1. In position B of FIGURE 1, the short blade edges 11 are employed with the forward blade surface 13 being brought very near to the working surface. Because of the chance of abrading or corroding blade forward surface 13, any means for removably attaching blade 10 to coupling 20 should be remote of blade forward surface 13, and thus, rearward rectangular socket 15 is desirable. When it is desired to employ implement 9 as a hoe, intermediate handle position A of FIGURE 1 is employed and rightward short blade edge 11 would be used for hoeing the earth. Of course handle positions A and B are merely illustrative of the many handle positions possible by varying the angular relationship between the axes of adapter 30 and coupling 20, preferably by means of the spindles 27 and the spaced holes 37 previously explained. Preferably the blade edges to be used for cutting plant growth are of linear configuration rather than concave so as to prevent the wrapping of cut weeds around handle 40. That blade edge to be used for scraping should be of linear configuration to match that of substrates normally encountered.

FIGURE 6 illustrates a square blade 60 that may be employed alternatively to rectangular blade 10. Blade 60 may also have the rearwardly extending square socket 15 so that rectangular blade 10 may be substituted with a square blade 60 at any time it is desired to do so.

From the foregoing the construction and operation of the exceedingly rugged and versatile multi-purpose implement will be readily understood and further explanation is believed to be unnecessary. However, since numerous modifications and changes will readiy occur to those skilled in the art, it is not desired to limit the invention to the exact construction shown and described, and accordingly, all suitable modifications and equivalents may be resorted to, falling within the scope of the appended claims.

I claim:
1. A multipurpose implement suitable for various tasks including cutting plant growth, hoeing the earth, and scraping ice and similarly adherent topical layers, said multipurpose implement comprising:
    (A) a noncircular blade, the noncircular periphery of said blade including at least four distinct edges, at least one of said blade distinct edges being of a linear configuration, said blade including a substantially planar forward side and a rearward side;
    (B) a rigid coupling member, the said coupling member including the axis thereof being disposed wholly rearwardly of the noncircular blade, means disposed wholly rearwardly of the blade planar forward side for removably attaching the forward portion of the coupling member to the noncircular blade at any one of a finite plurality of selectable spaced positions about the coupling member axis and also at a fixed angular relationship between the coupling member axis and the noncircular blade, said coupling member having a rearward portion;
    (C) a rigid adapter member having an elongate axis, said adapter member having a forward portion that is engageable at one of a plurality of finite angular positions with respect to the coupling member rearward portion whereby the axes of the rigid coupling and adapter members are adapted to assume any one of a plurality of definite angular relationships with respect to each other; and
    (D) an elongate relatively inflexible handle member attached to the adapter member rearward portion and extending rearwardly thereof.

2. The multipurpose implement of claim 1 wherein the noncircular periphery of said blade includes at least two distinct edges of linear configuration.

3. The multipurpose implement of claim 2 wherein the means for removably attaching the coupling member to the noncircular blade comprises a rearwardly-extending integral socket at the central portion of the blade, said socket having a noncircular configuration, said removable attachment means also comprising the forward portion of the coupling member being mateably engaged with the rearwardly-extending socket of the noncircular blade and a transverse rod removably passing through both the mateably engaged socket and coupling forward portion.

4. The multipurpose implement of claim 1 wherein the noncircular blade is of rectangular peripheral shape to provide two parallel elongate edges and two parallel shorter edges, the two elongate edges of said rectangular blade being of greater sharpness than the two shorter edges of said blade whereby the two elongate blade edges are particularly adapted for cutting plant growth while the two shorter blade edges are particularly adapted for hoeing and scraping operations; wherein the forward side of said rectangular blade is of substantially planar configuration.

5. The multipurpose implement of claim 4 wherein the rearward portion of the coupling member and the forward portion of the adapter member are in side-by-side adjacent relationship, said adjacent coupling and adapter members being transversely perforate in alignment, a transverse pin being removably positioned within the aligned transverse perforations of the coupling member rearward portion and the adapter member forward portion, said adapter member forward portion having a plurality of transverse holes each spaced at a given prescribed distance from the transverse pin and each adapter member transverse hole being angular spaced at regular intervals about said transverse pin, said coupling member having a plurality of integral spindles extending through transverse holes of the adapter forward portion.

6. The multipurpose implement of claim 3 wherein the noncircular blade includes two opposed elongated edges and two parallel shorter edges of linear configuration, the two elongate edges of said blade being of greater sharpness than the two shorter edges of said blade whereby the two elongate blade edges are particularly adapted for cutting plant growth while the two shorter blade edges are particularly adapted for hoeing and scraping operations; wherein the forward side of said blade is of substantially planar configuration; wherein the blade includes at the central portion of the rearward side an integral rearwardly-extending socket having a rectangular internal configuration, two alternating sidewalls of the socket rectangular interior being substantially parallel to each other and to the two elongate blade edges, two intervening sidewalls of the socket rectangular interior being substantially parallel to each other and to the two shorter blade edges, the said socket being transversely perforate through the alternating internal sidewalls and substantially normal to the two elongate blade edges; wherein said coupling member has a forward portion that is transversely perforate through two opposed surfaces, said coupling forward portion extending into the rectangular socket, the transverse perforations of the socket and of the coupling forward portion being aligned, and a transverse rod removably positioned within the aligned transverse perforations of the socket and of the coupling forward end, said coupling including a transversely-perforate rearward plate, said rearward plate having a plurality of integral transverse spindles having a prescribed spacing between said spindles; wherein said adapter has a transversely-perforate forward plate that is substantially parallel to the coupling rearward plate, the coupling rearward plate and the adapter forward plate being in side-by-side abutting relationship with the transverse perforations of each being in alignment, a transverse pin removably positioned within the aligned transverse perforations of the coupling rearward plate and the adapter forward plate, said adapter forward plate being provided with a plurality of transverse holes in alignment with the transverse spindles of the coupling rearward plate, said spindles extending into the holes of the adapter forward plate, said adapter rearward end including an axial bore; and wherein the forward end of the elongate handle extends into the axial bore of the adapter member and which is attached to the adapter, said elongate handle having a substantially normal relationship with respect to the transverse pivot pin.

7. The multipurpose implement of claim 6 wherein the blade is of rectangular peripheral shape and wherein the elongate handle includes an elliptical cross-sectional portion, the major axis of said elliptical cross-sectional portion being substantially parallel to the blade elongate edges.

8. The multipurpose implement of claim 6 wherein the forward plate of the adapter, rather than the rearward plate of the coupling, is provided with the plurality of integral transverse spindles; and wherein the rearward plate of the coupling, rather than the forward plate of the adapter member, is provided with the plurality of transverse holes in registry with the transverse spindles.

References Cited

UNITED STATES PATENTS 2,052,331    8/1936    White    30—318 X
1,685,141    9/1928    Schaefer    30—318

FOREIGN PATENTS 186,803    10/1922    Great Britain.

JAMES L. JONES, JR., *Primary Examiner*.